US009388743B2

(12) United States Patent
Manriquez

(10) Patent No.: US 9,388,743 B2
(45) Date of Patent: Jul. 12, 2016

(54) SEALING SYSTEM FOR FLANGED JOINT

(71) Applicant: Solar Turbines Inc., San Diego, CA (US)

(72) Inventor: Alejandro Manriquez, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 716 days.

(21) Appl. No.: 13/718,035

(22) Filed: Dec. 18, 2012

(65) Prior Publication Data
US 2014/0169959 A1  Jun. 19, 2014

(51) Int. Cl.
*F02C 7/28* (2006.01)

(52) U.S. Cl.
CPC . *F02C 7/28* (2013.01); *Y10T 403/52* (2015.01)

(58) Field of Classification Search
CPC ................. F02C 7/28; Y10T 403/52
See application file for complete search history.

(56) References Cited

U.S. PATENT DOCUMENTS

| | | | |
|---|---|---|---|
| 4,199,156 A * | 4/1980 | Oldham | E21B 10/25 175/371 |
| 6,464,230 B1 | 10/2002 | Tong et al. | |
| 2002/0140176 A1 | 10/2002 | Tong | |
| 2008/0252019 A1 * | 10/2008 | Yu | F16J 9/206 277/434 |
| 2010/0066027 A1 | 3/2010 | Vasagar | |
| 2012/0112415 A1 | 5/2012 | Benjamin et al. | |

* cited by examiner

*Primary Examiner* — Igor Kershteyn
(74) *Attorney, Agent, or Firm* — James R. Smith

(57) ABSTRACT

A sealing system is provided for a flanged joint. The sealing system includes a split seal and a spring. The split seal includes a radial outer surface, an axial outer surface, and a chamfered surface inclined with respect to the radial outer surface and the axial outer surface. The spring is disposed in urging contact with the chamfered surface and configured to apply an axial force, and a radial force on the axial outer surface, and the radial outer surface respectively.

14 Claims, 4 Drawing Sheets

SEALING SYSTEM FOR FLANGED JOINT

TECHNICAL FIELD

The present disclosure relates to a sealing system for a flanged joint, and more particularly to a sealing system configured to axially and radially seal a flanged joint.

BACKGROUND

Sealing assemblies are provided in a gas turbine engine to seal fluids prone to escaping from flanged joints between various sections of the gas turbine engine. U.S. Publication No. 2012/0112415 relates to a seal assembly including a first component, a second component, and a seal ring. The second component is located radially inward from the first component and defines an outer surface. Further, the second component defines a groove arranged to face the first component. A seal ring is positioned between the first and second components and extends at least partially into the groove. The seal ring is split to define a first free end and a second free end configured to overlap along a split surface.

SUMMARY

In one aspect, the present disclosure provides a sealing system for a flanged joint. The sealing system includes a split seal and a spring. The split seal includes a radial outer surface, an axial outer surface, and a chamfered surface inclined with respect to the radial outer surface and the axial outer surface. The spring is disposed in urging contact with the chamfered surface and configured to apply an axial force, and a radial force on the axial outer surface, and the radial outer surface respectively In another aspect, the present disclosure provides the flanged joint. The flanged joint includes a first flange, a second flange releasably connected to the first flange, and a sealing system disposed adjacent to the first and second flange. The sealing system includes the split seal, and the spring. The split seal includes the radial outer surface abutting the first flange, the axial outer surface abutting the second flange, and the chamfered surface inclined with respect to the radial outer surface and the axial outer surface. The spring is disposed in urging contact with the chamfered surface and configured to apply the axial force, and the radial force on the axial outer surface, and the radial outer surface respectively.

In another aspect, the present disclosure provides a gas turbine engine. The gas turbine includes a compressor system including the first flange, and a combustor system including the second flange releasably connected to the first flange. The sealing system is disposed adjacent to the first and second flange. The sealing system includes the split seal, and the spring. The split seal includes the radial outer surface abutting the first flange, the axial outer surface abutting the second flange, and the chamfered surface inclined with respect to the radial outer surface and the axial outer surface. The spring is disposed in urging contact with the chamfered surface and configured to apply the axial force, and the radial force on the axial outer surface, and the radial outer surface respectively.

In another aspect, the present disclosure provides a method of sealing the flanged joint. The method includes disposing the split seal adjacent to the first flange and the second flange. The method includes positioning the radial outer surface of the split seal to abut the first flange. The method includes positioning the axial outer surface of the split seal to abut the second flange. The method includes positioning the spring in urging contact with the chamfered surface of the split seal, the chamfered surface being inclined with respect to the radial outer surface and the axial outer surface. The method includes releasably connecting the first flange and the second flange to each other.

Other features and aspects of this disclosure will be apparent from the following description and the accompanying drawings.

DETAILED DESCRIPTION

Figure 1:
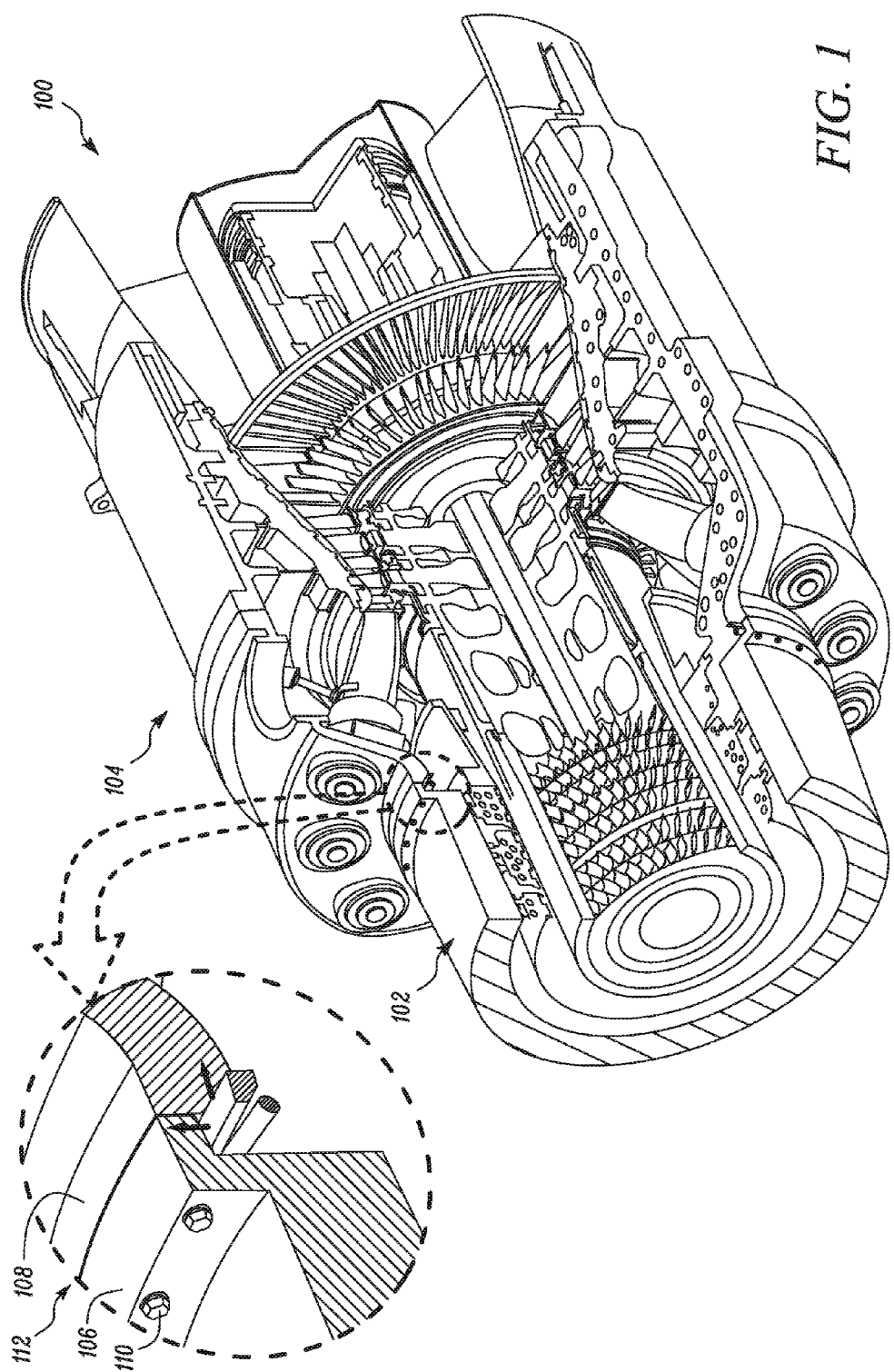
FIG. 1 is a perspective sectional view of an exemplary gas turbine engine in accordance with an embodiment of the present disclosure.

The present disclosure relates to a sealing system configured to axially and radially seal a flanged joint. FIG. 1 shows a front sectional view of an exemplary gas turbine engine 100 in which disclosed embodiments may be implemented. The gas turbine engine 100 may be of any type. In one embodiment, the gas turbine engine 100 may be an industrial turbine engine, for example, but not limited to, an axial flow turbine used for power generation or driving mechanical assemblies, or in jet propulsion systems. As shown in FIG. 1, the gas turbine engine 100 may embody an axial flow industrial turbine which may be used for power generation.

As shown in FIG. 1, the gas turbine engine 100 includes a compressor system 102, and a combustor system 104. The compressor system 102 may be configured to compress air and operatively provide the compressed air to various components of the combustor system 104. The compressor system 102 may be, but not limited to, a rotary compressor. Further, the compressor system 102 may be a single stage or a multistage compressor. In an embodiment as shown in FIG. 1, the compressor system 102 may embody a multistage rotary compressor including a first flange 106.

The combustor system 104 may be configured to receive the compressed air from the compressor system 102 and combust a mixture of fuel and the compressed air thus generating energy. The combustor system 104 includes a second flange 108. The second flange 108 is releasably connected to the first flange 106. In an embodiment as shown in FIG. 1, the second flange 108 may be releasably connected to the first flange 106 by threaded fasteners 110, for example, bolts.

Figure 2:
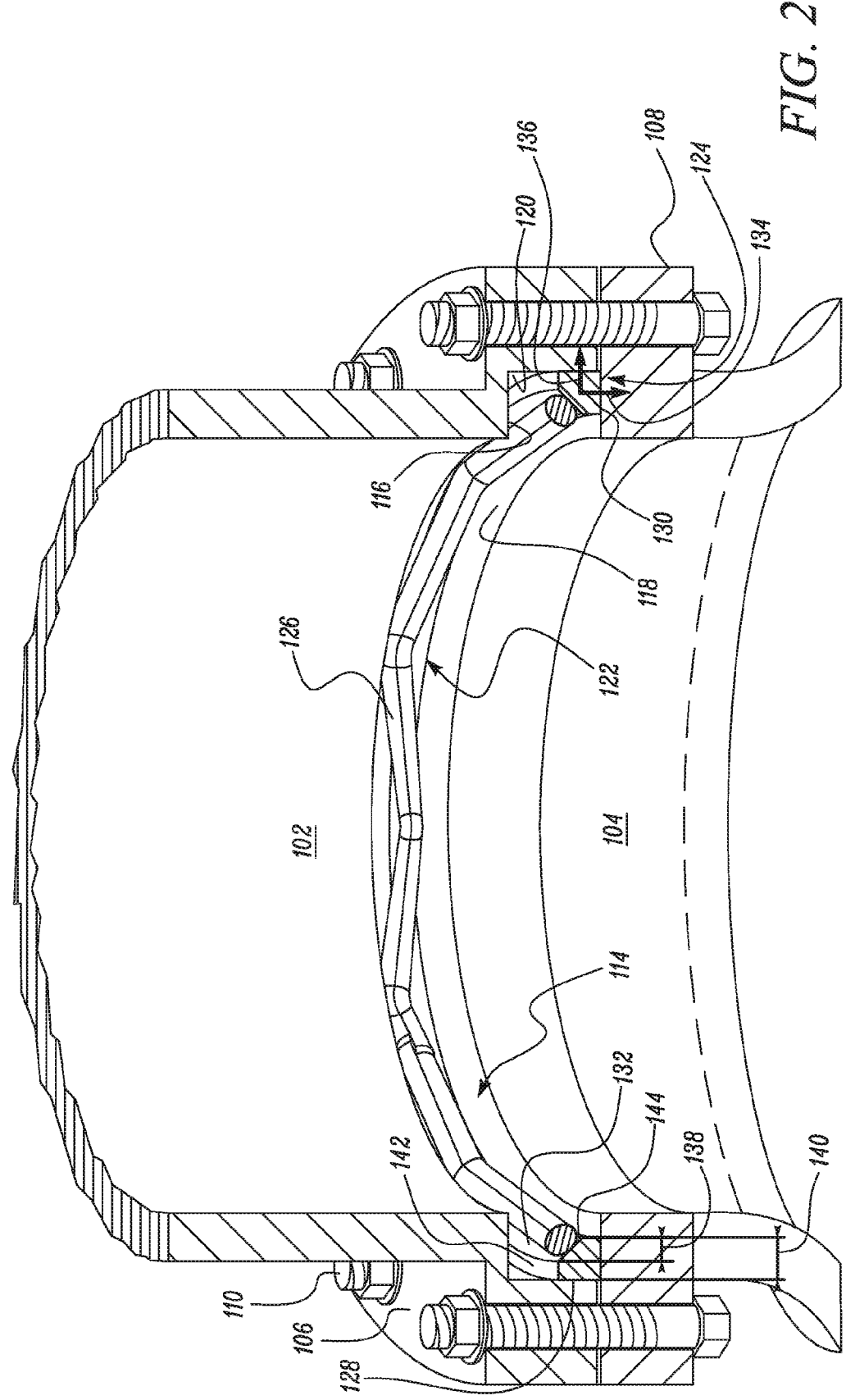
FIG. 2 is a breakaway perspective view of a flanged joint.

In an embodiment as shown in FIG. 2, the first flange 106 and the second flange 108 may together form a flanged joint 112 and define a seal pocket 114 therein. The seal pocket 114 may include a forward surface 116, an aft surface 118, and a circumferential surface 120.

In an embodiment as shown in FIG. 2, the forward surface 116 may be formed in the first flange 106 while the aft surface 118 and the circumferential surface 120 may be formed in the second flange 108. In this embodiment, the forward and aft is relative to the engine. However, a person having ordinary skill in the art will acknowledge that the forward and aft surfaces 116, 118 may be transposed and that the circumferential surface 120 may be formed within either flange such that the three surfaces together define the seal pocket 114.

As shown in FIG. 2, the sealing system 122 includes a split seal 124 and a spring 126. The split seal 124 includes a radial outer surface 128, an axial outer surface 130, and a chamfered surface 132 inclined with respect to the radial outer surface 128 and the axial outer surface 130. The radial outer surface 128 is abutted to the first flange 106. The axial outer surface 130 is abutted to the second flange 108.

The split seal 124 slides onto the circumferential surface 120 during assembly. The spring 126 is disposed in urging contact with the chamfered surface 132 and acts between the chamfered surface 132 and the forward surface 116 of the seal pocket 114. The spring 126 is configured to apply an axial force 134 on the axial outer surface 130 and a radial force 136 on the radial outer surface 128 respectively.

Although, the sealing system is explained herein in conjunction with a gas turbine engine 100, it is to be noted that the implementation of the sealing system in the gas turbine engine 100 is non-limiting of this disclosure. A person having ordinary skill in the art may acknowledge that the sealing system may also be implemented in other machines having flanged joints 112 or substantially similar configurations that may allow implementation of the sealing system therein.

In an embodiment, the radial outer surface 128 of the seal may be urged against the circumferential surface 120 of the seal pocket 114 while the axial outer surface 130 of the seal may be urged against the aft surface 118 of the seal pocket 114. A sealing force may be created at the radial outer surface 128 and the axial outer surface 130. This sealing force may bias the radial outer surface 128 against the circumferential surface 120 and the axial outer surface 130 against the aft surface 118 of the seal pocket 114 respectively. Therefore, the split seal 124 may be configured to restrict a passage of fluid into and out of the flanged joint 112.

Figure 3:
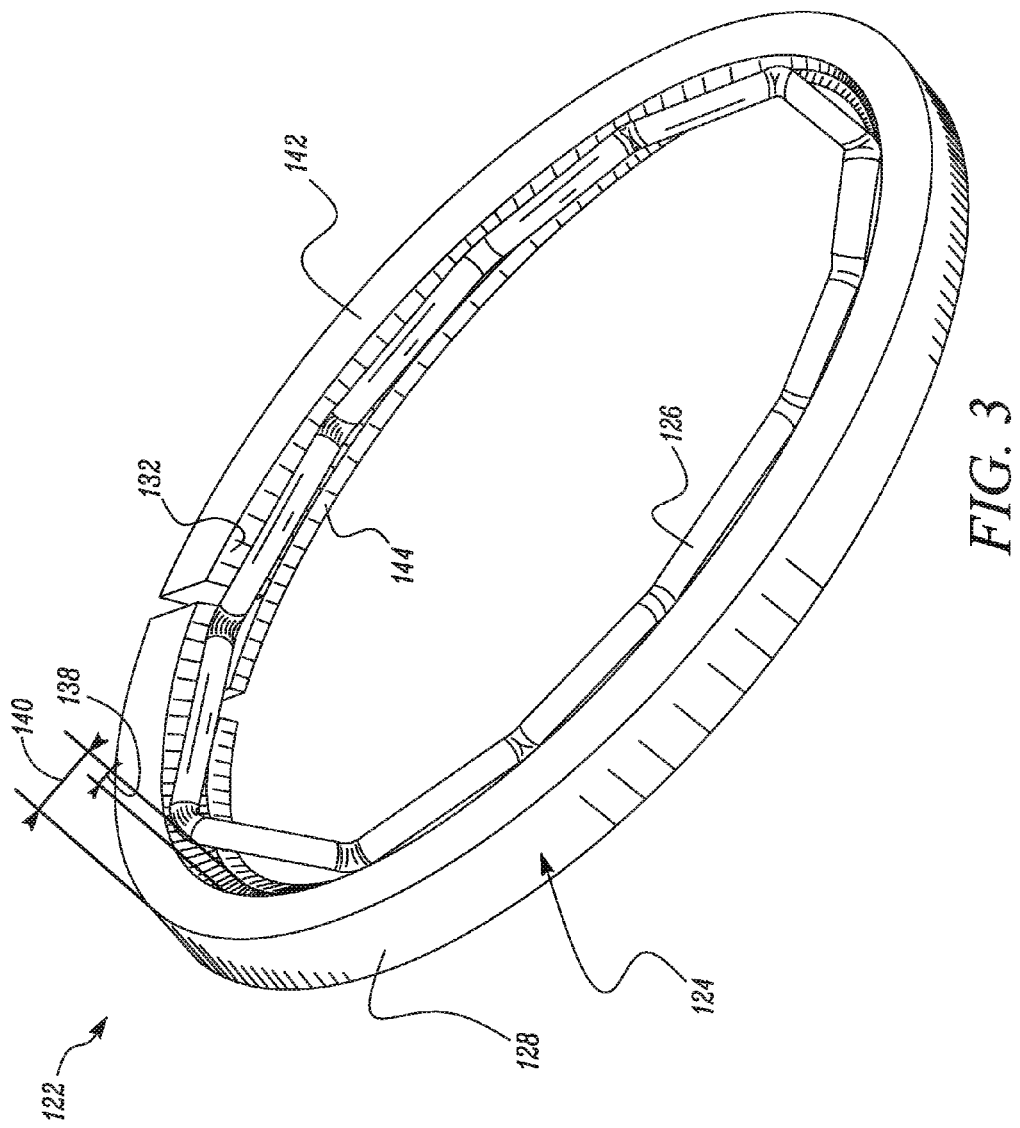
FIG. 3 is a side perspective view of a sealing system.

In an embodiment as shown in FIGS. 2-3, the split seal 124 may be of a polygonal cross section, such as a square cross section with a chamfered surface 132. In this embodiment, the chamfered surface 132 may extend across a portion 138 of a width 140 of the split seal 124 and hence, two additional surfaces 142, 144 may be present on either side of the chamfered surface 132. In other embodiments, the split seal 124 may be of other cross sections such as triangular, pentagonal, and the like.

In an embodiment, the chamfered surface 132 may be inclined at an angle of 45 degrees with respect to the radial outer surface 128 and the axial outer surface 130. In other embodiments, the angle of chamfer may be between 30 and 60 degrees with respect to the radial outer surface 128 or the axial outer surface 130.

The cross section of the split seal 124 and the angle of chamfer disclosed herein may be selected such that the split seal 124 may conform to a profile of the seal pocket 114 while the axial and the radial forces 134, 136 manifested at the respective surfaces 130, 128 may configure the split seal 124 to restrict the passage of fluid into and out of the flanged joint 112. Therefore, it is to be noted that the cross section of the split seal 124 and the inclination of the chamfered surface 132 with respect to the radial outer surface 128 and the axial outer surface 130 may vary based on a specific application and its corresponding sealing requirements.

With reference to the gas turbine engine 100 disclosed herein, in one embodiment, the split seal 124 may be configured to restrict a passage of oil into and out of the flanged joint 112. In other embodiments, the split seal 124 may be configured to restrict a passage of other fluids such as water, gases and the like into and out of the flanged joint 112. Therefore, oil disclosed herein is non-limiting of this disclosure and hence any fluid commonly known in the art may be restricted from passing into and out of the employed flanged joint 112.

In an embodiment as shown in FIG. 3, the spring 126 may be a marcel expander positionally restricted by the chamfered surface 132 of the split seal 124 and a forward surface 116 of the seal pocket 114. In other embodiments, the spring 126 may be a helical spring 126, or a wavy spring 126. It may be noted that the spring 126 disclosed herein may be of a compression type that is configured to operate under compression loads applied by the chamfered surface 132 and the forward surface 116 respectively. However, with reference to the preceding embodiments, a person having ordinary skill in the art may acknowledge that the configurations of the spring 126 and the forward surface 116 may vary based on a specific application of the sealing system and the subsequent design criteria associated with the application.

INDUSTRIAL APPLICABILITY

Figure 4:
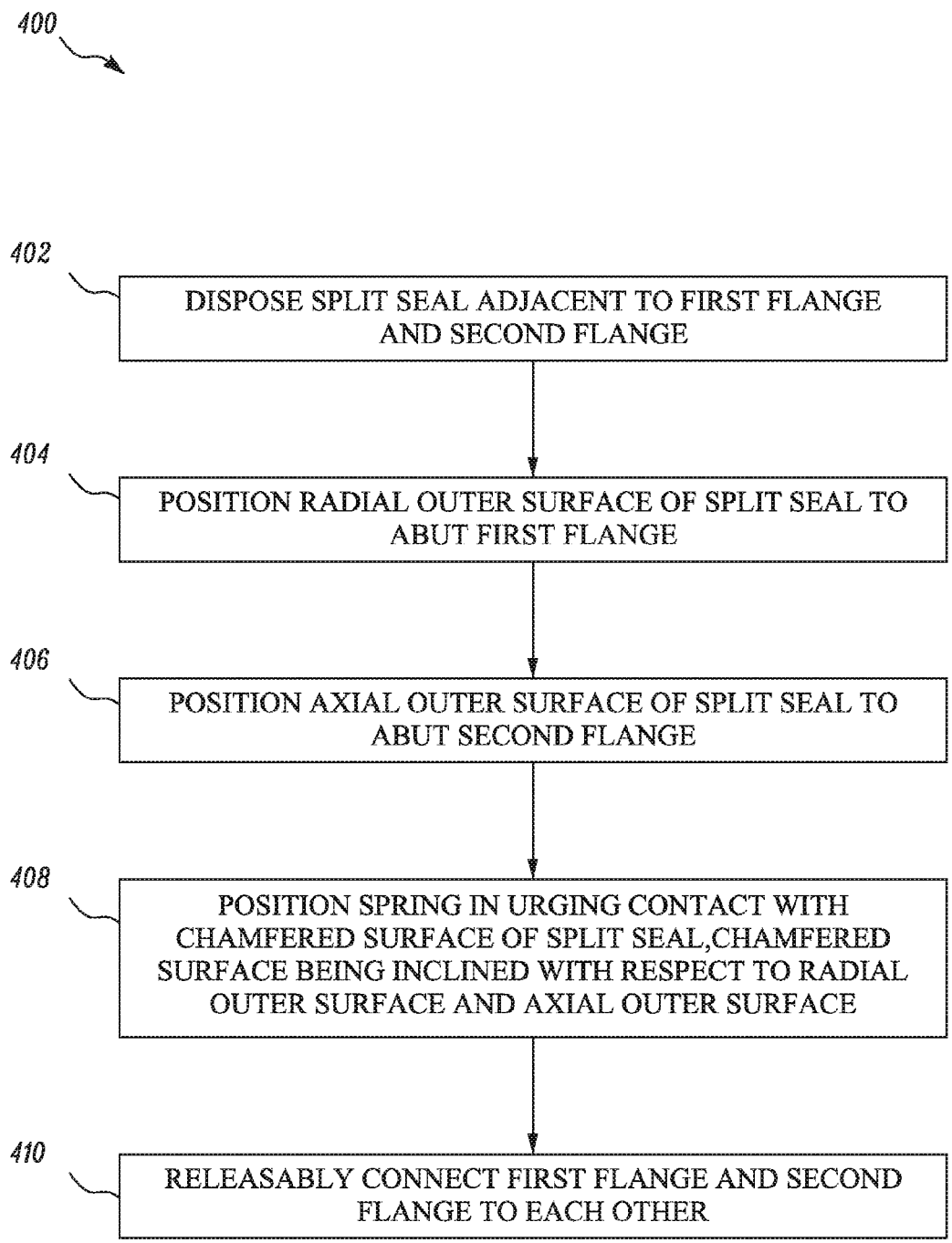
FIG. 4 is a method of sealing the flanged joint.

FIG. 4 illustrates a method 400 of sealing the flanged joint 112. At step 402, the method 400 includes disposing the split seal 124 adjacent to the first flange 106 and the second flange 108. At step 404, the method 400 includes positioning the radial outer surface 128 of the split seal 124 to abut the first flange 106. At step 406, the method 400 includes positioning the axial outer surface 130 of the split seal 124 to abut the second flange 108. At step 408, the method 400 includes positioning the spring 126 in urging contact with the chamfered surface 132 of the split seal 124, the chamfered surface 132 being inclined with respect to the radial outer surface 128 and the axial outer surface 130. At step 410, the method 400 includes releasably connecting the first flange 106 and the second flange 108 to each other.

In an embodiment, positioning the spring 126 in urging contact with the chamfered surface 132 of the split seal 124 includes configuring the spring 126 to apply the axial force 134 on the axial outer surface 130, and a radial force 136 on the radial outer surface 128 respectively.

Typically, in machines such as engines, leakage of fluid may occur at joints between various operating sections of the engine. With reference to gas turbine engines, in an embodiment, leakage of fluid may occur at joints between a combustor flange and a compressor flange. This leakage of fluid may entail wasteful loss of fluid and may additionally lead to reduction of working fluid pressure within the gas turbine engine.

Conventional seals used in such machines may axially or radially seal joints in the machine. However, the conventional seals may provide sealing in a single direction. The unidirectional sealing may be inadequate to restrict fluid leakage since the fluid may leak through other directions and surfaces of the seal and joint.

Further, in machines such as gas turbine engines using oil as an operating fluid, the conventional seals were typically held in place by the pressure force of the oil. However, during shut down of the gas turbine engine, the oil pressure may drop leading to the seal moving out of its designated sealing position thereby allowing the oil to leak from the joint.

Keeping in mind the aforesaid consequences, the chamfered surface 132 of the split seal 124 together with the spring 126, disclosed herein, may provide adequate sealing across the flanged joint 112 and hence prevent leakage by restricting passage of the fluid out of the flanged joint 112 in more than one direction. Further, the configuration of the sealing system involves constant urging of the radial outer surface 128 to the circumferential surface 120 and the axial outer surface 130 to the aft surface 118 of the seal pocket 114 thereby eliminating the need for oil pressure to keep the split seal 124 in place for sealing.

Therefore, various configurations of the sealing system disclosed herein may reduce a likelihood of the fluid travelling around the sides of the split seal 124 and leaking past the flanged joint 112 thereby creating a positive sealing force in more than one direction. The restriction of fluid leakage disclosed herein may include restriction to fluid leakage into and out of the flanged joint 112.

Keeping in mind the aforesaid consequences, the chamfered surface 132 of the split seal 124 together with the spring 126, disclosed herein, may reduce a likelihood of the fluid travelling around the sides of the split seal 124 and leaking past the flanged joint 112 thereby providing adequate sealing across the flanged joint 112. Therefore, various configurations of the sealing system disclosed herein may provide sealing in more than one direction thereby restricting passage of fluid into and out of the flanged joint 112 in more than one direction.

Hence, implementation of the sealing system in machines may reduce effort taken by a manufacturer in producing tighter leak-proof joints. Further, implementation of the sealing system in machines may reduce operating costs of the machine by avoiding working-fluid losses associated with the leakage. Furthermore, use of the sealing system in machines may avoid frequent replenishment of working fluid in the machine.

The sealing system may allow an operator to do away with cleaning routines that may have otherwise been performed to clean up leaked oil associated with use of conventional seals. Therefore, the configuration of the sealing system discussed in the present disclosure may increase overall productivity and profitability associated with the machine. The sealing system 122 and the split seal 124 therein may also be applicable to sealing applications besides flanged joints 112, such as sliding seals.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

I claim:

1. A sealing system for a flanged joint, the sealing system including:
    a split seal including:
        a radial outer surface;
        an axial outer surface; and
        a chamfered surface inclined with respect to the radial outer surface and the axial outer surface; and
    a spring disposed in urging contact with the chamfered surface and configured to apply an axial force, and a radial force on the axial outer surface, and the radial outer surface respectively; and
    wherein the flanged joint includes:
        a first flange; and
        a second flange releasably connected to the first flange, wherein the first and second flange together define a seal pocket including a forward surface, an aft surface, and a circumferential surface;
    wherein the spring of the sealing system acts between the chamfered surface and a forward surface of the seal pocket;
    wherein the forward and aft surfaces are forward and aft relative to the engine; and
    wherein the sealing system is housed in the seal pocket.

2. The sealing system of claim 1, wherein the split seal is of a polygonal cross section.

3. The sealing system of claim 1, wherein the spring is of a round cross section.

4. The sealing system of claim 1, wherein the spring is one of a helical spring, a marcel expander, and a wavy spring.

5. The sealing system of claim 1, wherein the split seal is configured to restrict a passage of fluid into and out of the flanged joint.

6. The flanged joint of claim 1, wherein the radial outer surface of the seal is urged against a circumferential surface of the seal pocket and the axial outer surface of the seal is urged against an aft surface of the seal pocket.

7. A gas turbine engine comprising:
    a compressor system including a first flange;
    a combustor system including a second flange releasably connected to the first flange; and
    a sealing system disposed adjacent to the first and second flange, the sealing system including:
        a split seal including:
            a radial outer surface abutting the first flange;
            an axial outer surface abutting the second flange; and
            a chamfered surface inclined with respect to the radial outer surface and the axial outer surface; and
        a spring disposed in urging contact with the chamfered surface and configured to apply an axial force, and a radial force on the axial outer surface, and the radial outer surface respectively.

8. The gas turbine engine of claim 7, wherein the first and second flange together define a seal pocket including a forward surface, an aft surface, and a circumferential surface.

9. The gas turbine engine of claim 8, wherein the sealing system is housed in the seal pocket.

10. The gas turbine engine of claim 9, wherein the radial outer surface of the seal is urged against a circumferential surface of the seal pocket and the axial outer surface of the seal is urged against an aft surface of the seal pocket.

11. The gas turbine engine of claim 9, wherein the spring of the sealing system acts between the chamfered surface and a forward surface of the seal pocket.

12. The gas turbine engine of claim 8, wherein forward and aft is relative to the gas turbine engine.

13. The gas turbine engine of claim 8, wherein the spring of the sealing system acts between the chamfered surface and the forward surface of the seal pocket.

14. A gas turbine engine comprising:
    a sealing system for a flanged joint, the sealing system including:
    a split seal including having a radial outer surface, an axial outer surface, and a chamfered surface inclined with respect to the radial outer surface and the axial outer surface; and
    a spring disposed in urging contact with the chamfered surface and configured to apply an axial force, and a radial force on the axial outer surface, and the radial outer surface respectively.

* * * * *